Nov. 20, 1923.

P. D. DE OLIVE 1,474,664

RESILIENT WHEEL

Filed Nov. 22, 1921

Inventor
Pierce D. De Olive

By Hardway Cathey
Attorneys

Patented Nov. 20, 1923.

1,474,664

UNITED STATES PATENT OFFICE.

PIERCE D. DE OLIVE, OF OAKHURST, TEXAS.

RESILIENT WHEEL.

Application filed November 22, 1921. Serial No. 516,982.

*To all whom it may concern:*

Be it known that I, PIERCE D. DE OLIVE, citizen of the United States, residing at Oakhurst, in the county of San Jacinto and State of Texas, have invented certain new and useful improvements in a Resilient Wheel, of which the following is a specification.

This invention relates to new and useful improvements in a resilient wheel.

One object of the invention is to provide a vehicle wheel having yieldable members interposed between the hub and the spokes forming a resilient cushion against which the inner ends of the spokes rest.

Another object of the invention is to provide a resilient wheel suitable for use on vehicles and which is of simple and durable construction and may be cheaply and easily manufactured.

With the above and other objects in view, the invention has particular relation to certain novel features of construction, operation and arrangement of parts an example of which is given in this specification and illustrated in the accompanying drawings wherein;—

Figure 1:
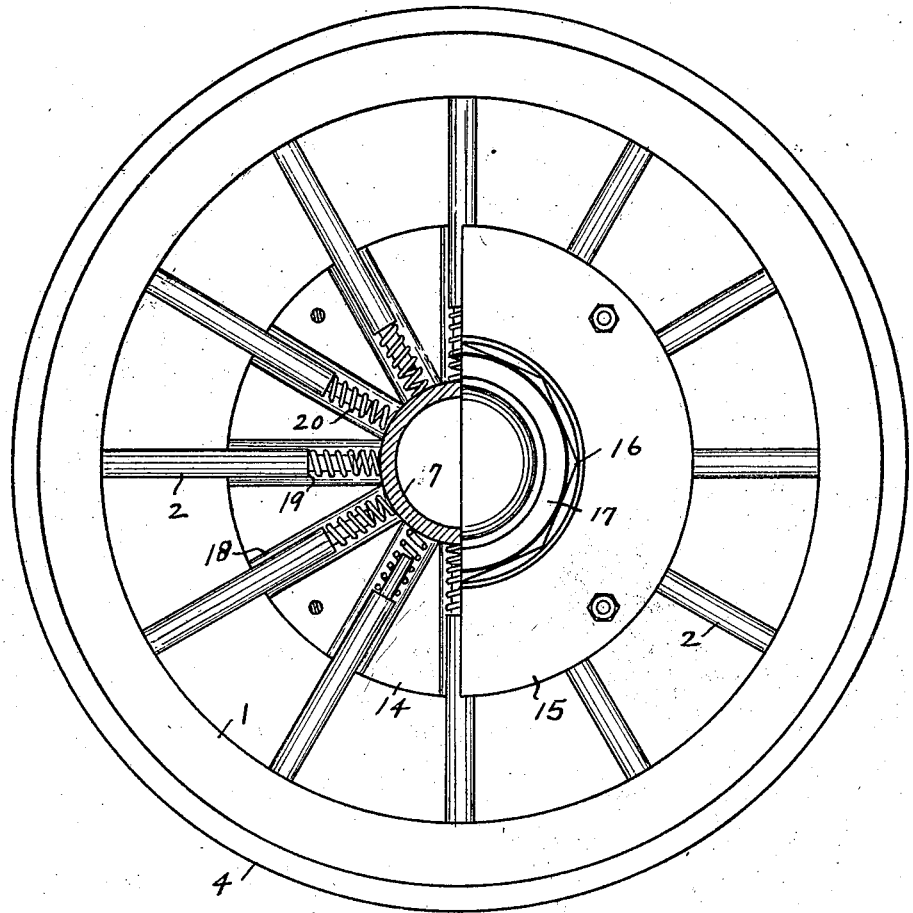
Figure 2:
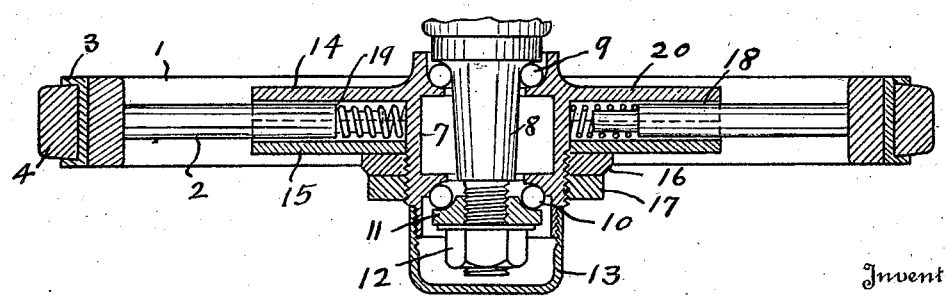

Figure 1 is a side view of one form of the wheel, shown partially in section, and Figure 2 is a cross sectional view thereof.

Referring now more particularly to the drawings the numeral 1 designates the wheel felly, to which the outer ends of the spokes 2 are secured. The felly has the tire rim 3 to receive the tire 4. This tire may be either solid or pneumatic, a solid tire being shown.

The numeral 7 designates the hub provided to receive the spindle 8 of the axle. The inner end of the hub is formed to receive the anti-friction bearings 9 which are interposed between the hub and spindle. The outer end of the hub is formed to receive the anti-friction bearings 10 which are held in place by the bearing ring 11 threaded onto the outer end of the spindle and locked in place by the lock nut 12. The outer end of the hub and spindle are enclosed by the usual hub cap 13.

The inner end of the hub has a disc-like flange 14 formed integrally therewith and fitted over the outer end of the hub there is a similar flange 15 which is secured in place by the nut 16 and the locking ring 17, both screwed onto the outer end of said hub. The flanges 14 and 15 have coinciding radiating grooves forming deep sockets 18 which receive the inner ends of the spokes 2. These inner ends are reduced forming annular shoulders 19 and surrounding said reduced ends interposed between said shoulders and the hub are strong coil springs 20. The inner ends of the spokes are spaced from the hub so as to permit relative movement of the felly with respect to the hub. The hub is thus supported by the yieldable members 20 and a resilient wheel thus provided.

What I claim is:

1. A resilient wheel, including a felly, radiating spokes whose outer ends are fixed to the felly, a hub, annular plates carried by the hub and formed with coinciding grooves forming bearings in which the inner ends of the spokes work loosely, coil springs confined in said bearings and interposed between the inner ends of the spokes and the hub, the inner ends of the spokes being reduced and fitting into the adjacent ends of the corresponding springs, and being formed with annular shoulders which work against said ends of said springs.

2. A resilient wheel, including a felly, radiating spokes whose outer ends are secured to said felly, a hub one end of which has an annular plate formed integrally therewith, a similar plate fitted onto the other end of said hub, said plates coinciding in position and fitting closely together, the inner sides of said plates having coinciding radiating grooves forming bearings in which the inner ends of the corresponding spokes work loosely, and yieldable members interposed between the hub and inner ends of the corresponding spokes.

In testimony whereof I have signed my name to this specification in the presence of two subscribing witnesses.

PIERCE D. DE OLIVE.

Witnesses:
W. H. DUNLAY,
E. V. HARDWAY.